(12) United States Patent
Musschoot et al.

(10) Patent No.: US 6,241,951 B1
(45) Date of Patent: *Jun. 5, 2001

(54) MATERIAL FLUIDIZING ASSEMBLY

(75) Inventors: Albert Musschoot, Barrington Hills; Richard B. Kraus, Barrington, both of IL (US)

(73) Assignee: General Kinematics Corporation, Barrington, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,196

(22) Filed: Jul. 31, 1997

(51) Int. Cl.[7] ............................. B01J 8/18; F27B 15/10
(52) U.S. Cl. .................. 422/143; 422/139; 422/311; 34/364; 34/582
(58) Field of Search .................. 422/143, 139, 422/311, 312, 297, 140, 145, 147; 34/364, 582, 583, 585

(56) References Cited

U.S. PATENT DOCUMENTS

| | | | |
|---|---|---|---|
| 2,816,010 | * 12/1957 | Shabaker | 422/200 |
| 3,256,612 | * 6/1966 | Dollinger | 34/364 |
| 3,404,845 | 10/1968 | Schmeling et al. | 239/556 |
| 4,115,929 | 9/1978 | Staub et al. | 34/369 |
| 4,257,171 | 3/1981 | Johnson et al. | 34/582 |
| 4,574,496 | 3/1986 | Sedlacek | 34/585 |
| 4,628,834 | * 12/1986 | McKelvie | 110/263 |
| 4,764,347 | * 8/1988 | Milligan | 422/143 |

FOREIGN PATENT DOCUMENTS

| | | |
|---|---|---|
| 2840496 | * 8/1979 | (DE) . |
| 300694 | * 7/1992 | (DE) . |
| 1 431 763 | 4/1976 | (GB) . |
| 940829 | * 11/1980 | (SU) . |

* cited by examiner

Primary Examiner—Marian C. Knode
Assistant Examiner—Alexa A. Doroshenk
(74) Attorney, Agent, or Firm—Marshall, O'Toole, Gerstein, Murray & Borun

(57) ABSTRACT

In order to prevent material from passing into a plenum chamber, an assembly for fluidizing the material includes a deck supported above the plenum chamber. The plenum chamber has an intake in communication with a source of pressurized air, and the deck includes an inverted channel for distributing the pressurized air to the material in a preselected air distribution pattern and an inverted channel for supporting the material in a position generally above and in spaced relation to the air distributing channel. With this arrangement, the material supporting channel is disposed in spaced relation to the air distributing channel to permit the pressurized air from the plenum chamber to fluidize the material.

15 Claims, 4 Drawing Sheets

MATERIAL FLUIDIZING ASSEMBLY

FIELD OF THE INVENTION

The present invention is generally related to material fluidizing techniques and, more particularly, a material fluidizing assembly that prevents the material from passing into the air plenum chamber.

BACKGROUND OF THE INVENTION

Over the years, there has been a steady progression in the development of techniques that are useful for fluidizing material in a vibrating bed for a wide variety of different applications. The material to be fluidized is typically granular in nature such as, for example, sand, and a gas such as air is used to fluidize the material. More particularly, the gas is pressurized and then directed into a plenum chamber which permits the pressurized gas to pass through a vibrating material-supporting bed.

Typically, the vibrating bed will comprise a perforated plate or porous membrane which is known as a distributing deck. As will be appreciated, the distributing deck serves the purpose of permitting the pressurized gas to pass into the material.

Of course, the supporting bed must be in communication with the plenum chamber and must have openings in order for the pressurized gas to pass into the material which is to be fluidized. It is commonly the case that the gas is at a sufficient velocity and pressure that the material, even though granular in nature, cannot pass through the relatively small openings in the bed into the plenum chamber. However, if there is a failure in the equipment that pressurizes the gas, the granular material can pass through the openings in the bed requiring its removal from the plenum chamber.

In other words, a vibrating fluidized bed assembly is typically operated by producing pressurized gas in advance of the actual introduction of the granular material. Then, when the granular material is supplied to the bed above the plenum chamber through the air distributing plate or deck, the velocity and pressure of the gas is sufficient to prevent the granular material from passing through the openings in the bed under normal operating conditions. Subsequently, the granular material is removed from the fluidized bed in advance of discontinuing the supply of pressurized gas to the plenum chamber.

As a result, the granular material will usually not pass through the openings in the bed into the plenum chamber unless there is a loss of pressure that occurs for some unexpected reason such as a power failure or equipment failure. This will typically not occur, but the difficult and time-consuming task of removing the granular material from the plenum chamber, if it should occur, is a matter for serious concern due to the potentially adverse consequences. For instance, if the granular material was being fluidized at the moment of an equipment failure and the vibrating motion would continue, the granular material would pass through the openings in the distributor deck causing material leakage to the plenum chamber.

Not uncommonly, the clean-up task requires the disassembly of the equipment to a significant degree in order to reach the interior of the plenum chamber. In a vibrating fluidized bed assembly where the plenum chamber is integral with the distributor deck, continued vibratory motion will cause material to sift and accumulate in the plenum chamber. This makes it impossible to use the equipment for the intended purpose for an undesirably long period of time and requires a significant amount of manual labor. Clearly, there is a need to be able to ensure that the material will not pass into the plenum chamber under any circumstances even in the event of a power failure or equipment failure. However, there is also a recognition that any proposal for accomplishing this objective must not interfere with the effectiveness of the fluidization process. This has attempted to be achieved in the past by utilizing a mushroom-shaped cover over each of the openings in the bed to prevent the material from passing therethrough. Unfortunately, this has not been fully satisfactory due to the complexity and cost and because articles that are placed in the fluidized material can become caught on these covers.

The present invention is directed to overcoming one or more of the foregoing problems and achieving one or more of the resulting objects.

SUMMARY OF THE INVENTION

It is a principal object of the present invention to provide an assembly for fluidizing a material in a manner that overcomes the problems of prior techniques. It is a further object of the present invention to provide such an assembly which is also capable of preventing the material to be fluidized from passing into the plenum chamber in the event of a pressure loss. It is also an object of the present invention to provide an assembly for fluidizing a material utilizing a pair of inverted, spaced-apart channels or angles over the orifices in a deck plate.

Accordingly, the present invention is directed to an assembly for fluidizing a material wherein the assembly includes a plenum chamber having an intake in communication with a source of pressurized air and also includes a deck supported above the plenum chamber. The deck includes means for distributing the pressurized air to the material in a preselected air distribution pattern, and it also includes means for supporting the material in a position generally above and in spaced relation to the air distributing means. More specifically, the assembly for fluidizing a material is formed such that the material supporting means is disposed in spaced relation to the air distributing means to permit the passage of air while preventing the material from passing into the plenum chamber.

In the exemplary embodiment, the deck includes a deck plate which comprises a top wall of the plenum chamber, and the air distributing means is disposed on the deck plate. With this arrangement, the deck plate preferably has a plurality of orifices for passage of the pressurized air from the plenum chamber to the air distributing means.

In the preferred embodiment, the air distributing means suitably comprises a plurality of inverted channels or angles with each advantageously including a plurality of air passage orifices. In this manner, the material supporting means can be disposed in a position generally over the air passage orifices in order to prevent the material from passing therethrough.

In a most highly preferred embodiment, the air distributing means and the material supporting means together comprise a pair of inverted channels or angles with the lower of the channels or angles having a plurality of orifices and the upper of the channels or angles being disposed in spaced relation to the lower of the channels or angles in order to permit passage of the pressurized air into the material. Still more specifically, the air distributing means and the material supporting means together advantageously comprise a pair of inverted, superposed V-shaped angles which are disposed in spaced apart relation with the lower of the angles having a plurality of orifices in the apex thereof and the upper of the angles being formed to have a sealed apex.

Other objects, advantages and features of the present invention will become apparent from a consideration of the following specification taken in conjunction with the accompanying drawings.

DETAILED DESCRIPTION OF THE PREFERRED EMBODIMENT

Figure 1:
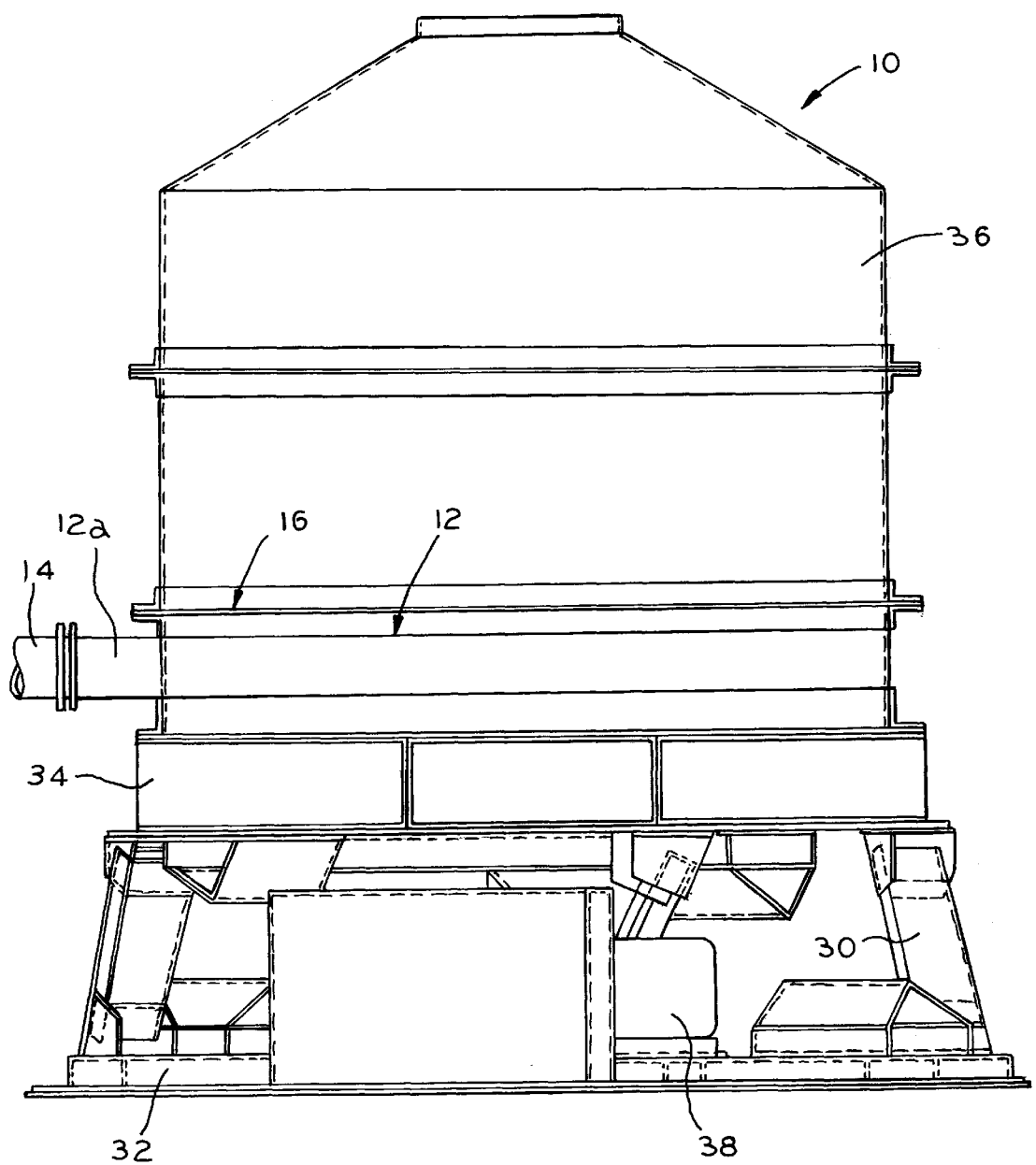
FIG. 1 is a front elevational view of an assembly for fluidizing a material in accordance with the present invention.

In the illustrations given, and with reference first to FIG. 1, the reference numeral 10 designates generally an assembly for fluidizing a material in accordance with the present invention. The assembly 10 includes a plenum chamber 12 having an intake as at 12a in communication with a source (not shown) of pressurized air which passes through a delivery pipe 14. A deck 16 is supported above the plenum chamber 12 and includes means, generally designated 18, (see FIG. 4) for distributing the pressurized air to the material 20 in a preselected air distribution pattern, and the deck 16 also includes means, generally designated 22, for supporting the material 20 generally above and in spaced relation to the air distributing means 18. The assembly 10 is constructed with the material supporting means 22 in spaced relation to the air distributing means 18 to permit the material 20 to be fluidized by the passage of the pressurized air from the plenum chamber 12 into the material. As for the manner in which this occurs, it will be described in greater detail in conjunction with the various components that comprise the material fluidizing assembly 10.

Figure 4:
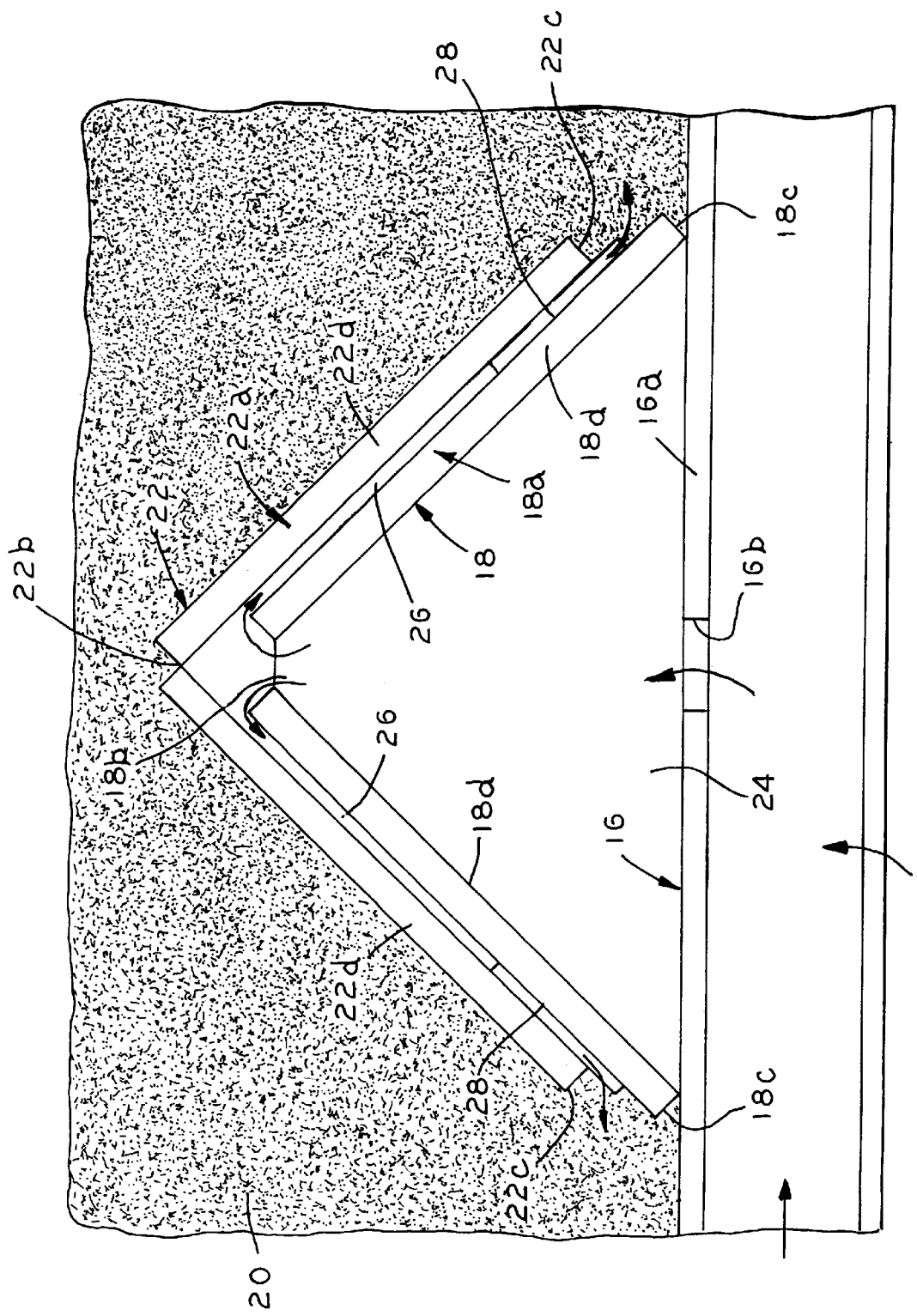
FIG. 4 is a cross-sectional view taken generally along the lines 4—4 of FIG. 3.

Referring to FIGS. 1 and 4, the deck 16 will be understood to comprise a deck plate 16a forming a top wall of the plenum chamber 12 and having a plurality of orifices such as 16b sized and arranged to control passage of the pressurized air from the plenum chamber 12. The arrangement of the orifices 16b for the particular assembly 10 illustrated in the drawings will be appreciated by referring to FIG. 2 wherein there are shown three concentric rings of orifices 16b, although it will be appreciated that this is only one of many arrangements that are possible depending upon the particular material fluidizing application. In other words, while the arrangement of the orifices 16b on the deck plate 16 has been shown as three concentric rings, for either a circular or rectangular deck construction, the orifices could be arranged in parallel linear rows extending longitudinally, laterally or diagonally, or in any other pattern that may be desirable.

Referring specifically to FIG. 4, the air distributing means 18 will be understood to comprise an inverted channel preferably in the form of an inverted V-shaped angle 18a disposed above the orifices 16b on the deck plate 16a. It will be appreciated, of course, that, with three concentric circles of orifices 16b in the illustrated embodiment, there will be three such inverted channels or angles 18a, each of which will have a plurality of air passage orifices 18b. As will also be appreciated, the material supporting means 22 are each disposed over the air passage orifices 18b in a corresponding one of the inverted channels or angles 18a to prevent the material 20 from passing therethrough.

With regard to the material supporting means 22, they each also advantageously comprise an inverted channel or inverted V-shaped angle 22a disposed in superposed relation above a respective one of the inverted channels or angles 18a. It will also be seen that the inverted channels or angles 22a each have a sealed apex 22b. Still additionally, the inverted channels or angles 22a each have a pair of spaced apart, lower edges 22c to permit passage of the pressurized air from the plenum chamber 12 into the material 20 to cause the material to be fluidized.

As will now be appreciated, the air distributing channels 18a and the material supporting channels 22a together comprise respective pairs of inverted, superposed V-shaped angles disposed in spaced apart relation with the lower of the angles 18a having the orifices 18b in the apex thereof and the upper of the angles 22a having sealed apices 22b. It will also be appreciated that the deck plate 16a is preferably generally planar with the air distributing angles 18a each being disposed on the deck plate 16a and having their lower edges 18c to the deck plate 16a to define generally triangular shaped air distributing chambers such as 24. In addition, and as clearly shown in FIG. 4, the respective superposed pairs of air distributing angles 18a and material supporting angles 22a have closely spaced legs 18d and 22d, respectively, defining thin, uniform air flow paths 26 permitting pressurized air to pass through the orifices 18b and then between the legs 18d and 22d.

Figure 2:
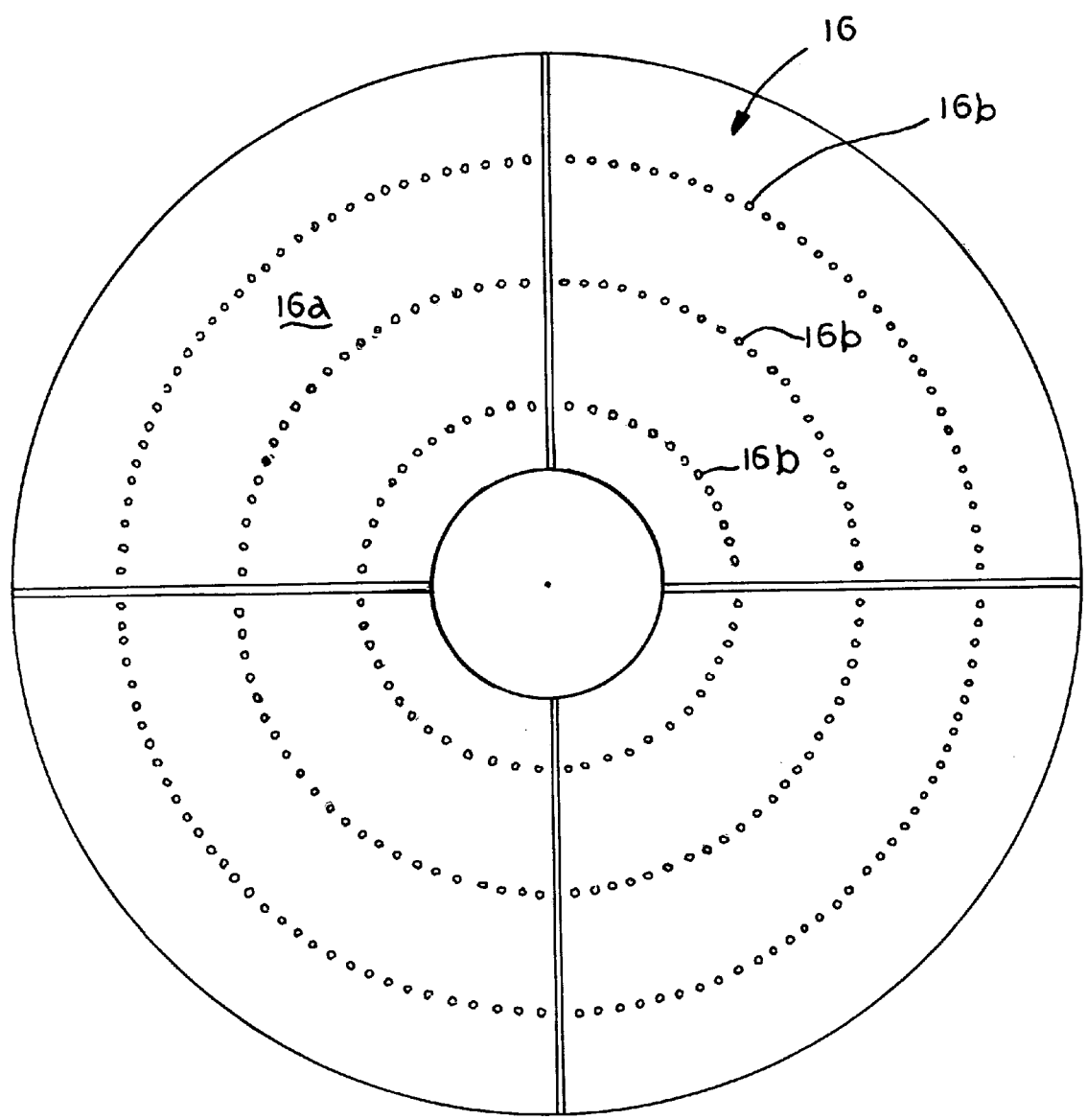
FIG. 2 is a plan view of a deck plate for the material fluidizing assembly of FIG. 1.
Figure 3:
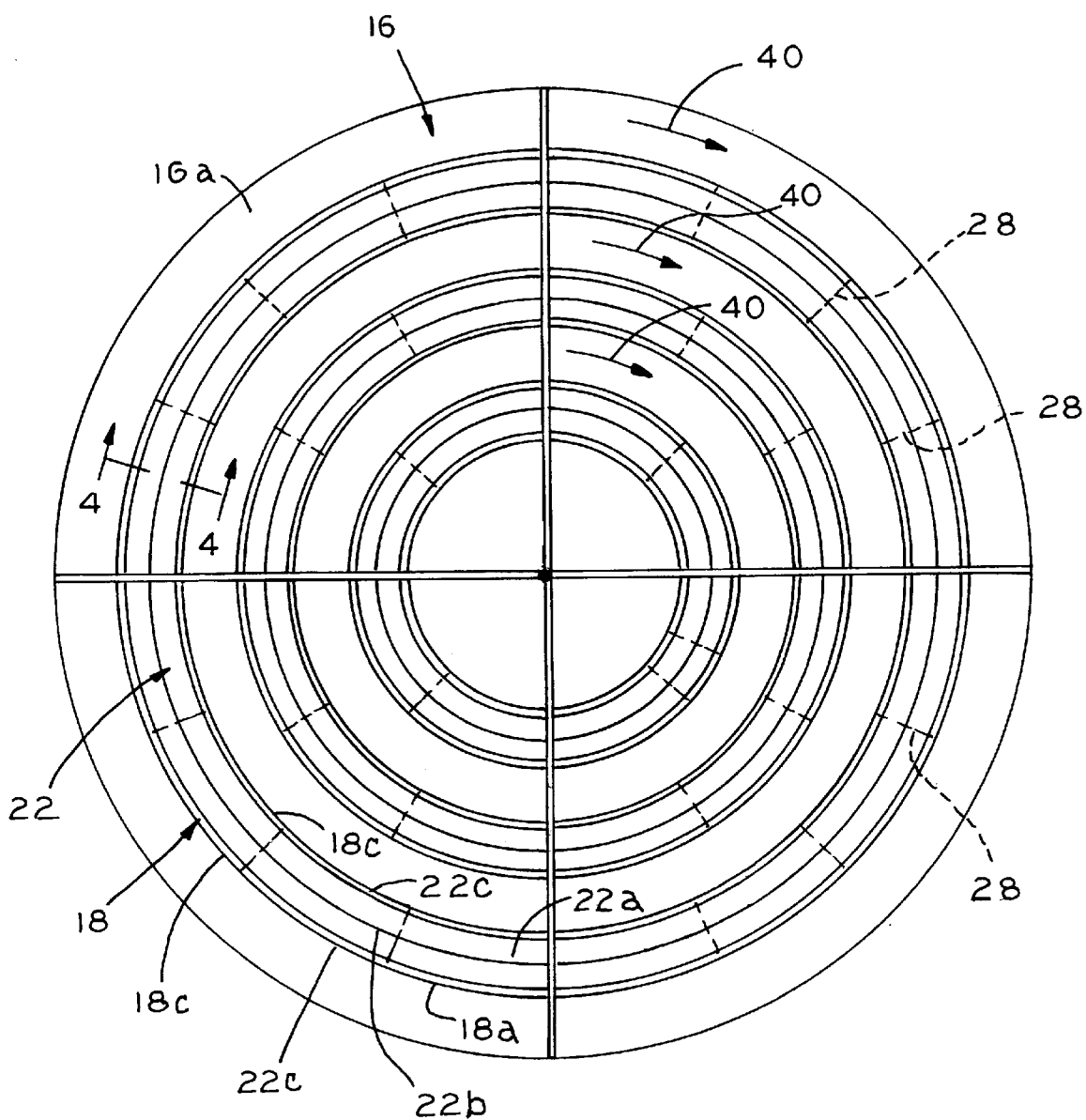
FIG. 3 is a plan view similar to FIG. 2 showing the positioning of inverted channels.

Referring now to FIGS. 3 and 4, the air distributing angles 18a each have their spaced apart, lower edges 18c welded to the deck plate 16a on opposite sides of the orifices 16b to receive pressurized air into the air distributing chambers 24 (see, also, FIG. 2). It will be seen most clearly from FIG. 4 that the lower edges 18c of the air distributing angles 18a are also preferably positioned generally below the corresponding lower edges 22c of the material supporting angles 22a, but in closely spaced relation thereto. With this arrangement, the thin, uniform air flow paths 26 between the closely spaced legs 18d and 22d generally cause the pressurized air to be directed outwardly and downwardly toward the deck plate 16a before being released into the material 20 supported thereon.

Still referring to FIGS. 3 and 4, the material supporting angles 22a are preferably mounted to the air distributing angles 18a by means of shim plates 28. The shim plates 28 will be seen to be positioned in spaced relation, one from the other, (FIG. 3) and, thus, the lower edges 18c of the air distributing angles 18a can be welded to the deck plate 16a, the shim plates 28 can be welded to the legs 18d of the air distributing angles 18, and the legs 22d can be welded to the shim plates 28. In this manner, the relative positioning of the components can be maintained to ensure the thin, uniform air flow paths 26 between the closely spaced legs 18d and 22d.

As previously discussed, the exact sizing and geometric arrangement of the orifices 16b can be varied as may desired for a particular material fluidizing application. It will likewise be appreciated that the size and spacing of the orifices 18b, as well as the space defining the thin, uniform air flow paths 26, can be varied to thereby establish a preselected air distribution pattern. In this connection, the space between the lower edges 18c of the air distribution angles 18a and the space between adjacent air distribution angles 18a can also be varied.

By controlling all of these parameters, it is possible to completely control the characteristics of fluidization of the material 20 in the assembly 10.

As previously suggested hereinabove, the assembly 10 can be varied in terms of its details to accommodate a particular fluidizing application. It will be appreciated that the assembly 10 has been illustrated as a vibratory fluidizing apparatus that includes a plurality of slat springs 30 extending from a base 32 to a supporting frame structure 34 upon which the plenum chamber 12 and a fluidizing chamber housing 36 are supported. As for the fluidizing chamber housing 36, it is generally cylindrical and secured to the deck 16 substantially as illustrated in FIG. 1.

In order to impart circular vibratory motion to the material 20 within the fluidizing chamber 36, an eccentric motor 38 is provided in the material fluidizing assembly 10. The eccentric motor 38 in combination with the slat springs 30 causes the material 20 supported on the deck plate 16a to be lifted and turned so as to be conveyed in a generally circular path such as represented by the arrows 40 in FIG. 3. Once again, however, it should be kept in mind that the assembly 10 has been shown merely for the purpose of illustrating the inventive concept as claimed herein.

Nevertheless, the present invention is particularly well suited for use with any vibratory fluidizing apparatus in addition to static fluidizing apparatus. The utilization of a plurality of slat springs in combination with an eccentric motor to impart vibratory motion, whether circular or linear, makes it possible to convey a material within a material fluidizing assembly whether or not the pressurized air is being delivered through the plenum chamber, i.e., the vibratory motion typically conveys the material from an inlet to an outlet and, between the inlet and outlet, the material would normally be fluidized in the presence of pressurized air. Thus, in the event of a loss of pressurized air, it may still be desirable to be able to convey the material to the outlet utilizing the vibratory motion in order to be able to remove the material from the assembly.

By utilizing the benefits of the present invention, it is possible to accomplish this objective in a highly effective manner inasmuch as the material cannot pass into the plenum chamber as it is being conveyed to the outlet even in the event of a loss of pressurized air.

With the foregoing disclosure of the inventive concept, those skilled in the art will immediately recognize its applicability to any fluidizing application. Thus, the invention is equally applicable to both static and vibratory fluidizing equipment and to any arrangement of orifices and inverted air distribution and material supporting channels or angles. In all such arrangements, the present invention makes it possible to prevent the material from passing through the orifices into the plenum chamber.

While in the foregoing there has been set forth a preferred embodiment of the invention, it will be appreciated that the details herein given may be varied by those skilled in the art without departing from the true scope and spirit of the appended claims.

What is claimed is:

1. An assembly for fluidizing a material, comprising:
   a plenum chamber having an intake in communication with a source of pressurized air;
   a deck supported above said plenum chamber, and including:
      means for distributing said pressurized air to said material in an air distribution pattern, said air distributing means including a plurality of orifices formed in the deck, and an inverted air distributing channel attached to said deck to form an air distributing chamber, said air distributing chamber having an apex including a plurality of spaced air passage orifices formed in the apex to distribute said pressurized air across said air distribution pattern; and
      means for supporting said material generally above and in spaced relation to said air distributing channel to form thin, uniform air flow paths therebetween.

2. The material fluidizing assembly of claim 1 wherein said deck includes a dock plate comprising a top wall of said plenum chamber, and said air distributing channel is disposed on said deck plate, said deck plate having the plurality of orifices for passages of said pressurized air form said plenum chamber to said air distributing chamber.

3. The material fluidizing assembly of claim 1 wherein said air distributing means comprises a plurality of inverted channels, each of said inverted channels having some of said plurality of air passage orifices formed therein, said material supporting means being disposed over said air passage orifices to prevent material from passing therethrough.

4. The material fluidizing assembly of claim 1 wherein said material supporting means comprises a plurality of inverted channels, each of said inverted channels having a pair of spaced apart lower edges, said spaced apart lower edges permitting passage of said pressurized air from said plenum chamber to cause said material to be fluidized.

5. The material fluidizing assembly of claim 1 wherein said air distributing means and said material supporting means together comprise a pair of inverted channels with the lower of said channels having said plurality of orifices and the upper of said channels being disposed in spaced relation to the lower of said channels to permit passage of said pressurized air into said material, said uniform air flow paths being formed between said inverted channels.

6. An assembly for fluidizing a material, comprising:
   a plenum chamber having an intake in communication with a source of pressurized air;
   a deck supported above said plenum chamber, and including:
      a deck plate forming a top wall of said plenum chamber and having a plurality of orifices sized and arranged to control passage of said pressurized air from said plenum chamber;
      means for distributing said pressurized air passing through orifices in said deck plate to said material in an air distribution pattern, said air distributing means including an inverted air distributing channel attached to said deck plate to form an air distributing chamber, said air distributing chamber having an apex including a plurality of spaced air passage orifices formed in the apex to distribute said pressurized air across said air distribution pattern; and
      means for supporting said material general above and in spaced relation to said orifices in said deck plate to prevent said material from passing into said plenum chamber;
   said material supporting means being disposed in spaced relation to said air distributing means to form, uniform air flow paths therebetween.

7. The material fluidizing assembly of claim 6 wherein said air distributing means comprises a plurality of inverted channels disposed on said deck plate, each of said inverted channels having some of said plurality of air passage orifices formed therein, said material supporting means being disposed over said air passage orifices to prevent said material from passing therethrough.

8. The material fluidizing assembly of claim 6 wherein said material supporting means comprises a plurality of inverted channels disposed in said air distributing means with each of said inverted channels having a pair of spaced apart lower edges permitting passage of said pressurized air from said plenum chamber to cause said material to be fluidized.

9. The material fluidizing assembly of claim 6 wherein said air distributing means and said material supporting means together comprise a pair of inverted channels with the lower of said channels having said plurality of orifices and the upper of said channels being disposed in spaced relation to the lower of said channels to permit passage of said pressurized air into said material, said uniform air flow paths being formed between said inverted channels.

10. The material fluidizing assembly of claim 6 wherein said air distributing means and said material supporting means together comprise a pair of inverted, superposed V-shaped angles disposed in spaced apart relation with the lower of said angles having said plurality of orifices in the apex thereof and the upper of said angles having a sealed apex.

11. A vibratory material fluidizing assembly, comprising:

a plenum chamber having an intake in communication with a source of pressurized air;

a deck supported above said plenum chamber, and including:

a deck plate forming a top wall of said plenum chamber and having a plurality of orifices sized and arranged to control passage of said pressurized air from said plenum chamber;

means for distributing said pressurized air passing through said orifices in said deck plate to a material on said deck in an air distribution pattern;

means for supporting said material generally above and in spaced relation to said orifices in said deck plate to prevent said material from passing into said plenum chamber; and means for imparting vibratory motion to said deck in order to convey said material from one point to another point in relation to said deck plate;

said material supporting means being disposed in spaced relation to said air distributing means;

said air distributing means comprising a plurality of inverted channels attached to said deck plate and disposed above said orifices in said deck plate to form a plurality of air distributing chambers, each of said inverted channels having a plurality of air passage orifices formed in an apex thereof, said material supporting means being disposed over said air passage orifices in said inverted air distributing channels to prevent said material from passing therethrough;

said material supporting means also comprising an inverted channel disposed in superposed relation above each of said inverted air distributing channels to form uniform air flow paths therebetween said inverted material supporting channels having a pair of spaced apart material supporting channel lower edges permitting passage of said pressurized air from said plenum chamber into said material to thereby cause said material to be fluidized.

12. The vibratory material fluidizing assembly of claim 11 wherein said air distributing channels and said material supporting channels together comprise a pair of inverted, superposed V-shaped angles disposed in spaced apart relation with the lower of said angles having said plurality of air passage orifices in the apex thereof and the upper of said angles having a sealed apex.

13. The vibratory material fluidizing assembly of claim 12 wherein said deck plate is generally planar, said air distributing angles and said deck plate define a generally triangular shaped air distributing chamber, and said superposed air distributing angles and material supporting angles have closely spaced legs defining thin, uniform air flow paths therebetween.

14. The vibratory material fluidizing assembly of claim 13 wherein said air distributing angles each have a pair of spaced apart, air distributing angle lower edges secured to said deck plate so as to cover said orifices therein and positioned generally below said spaced apart, material supporting angle lower edges in closely spaced relation thereto.

15. The vibratory material fluidizing assembly of claim 13 wherein said thin, uniform air flow paths between said closely spaced legs of said superposed air distributing angles and material supporting angles generally cause said pressurized air to be directed outwardly and downwardly toward said deck plate before release into said material supported thereon.

\* \* \* \* \*

UNITED STATES PATENT AND TRADEMARK OFFICE
CERTIFICATE OF CORRECTION

PATENT NO. : 6,241,951 B1
DATED : June 5, 2001
INVENTOR(S) : Musschoot et al.

It is certified that error appears in the above-identified patent and that said Letters Patent is hereby corrected as shown below:

<u>Column 6,</u>
Line 11, "dock" should be -- deck --.
Line 14, "passages" should be -- passage --.

Line 54, "general" should be -- generally --.

Signed and Sealed this

Second Day of April, 2002

Attest:

JAMES E. ROGAN
Attesting Officer     *Director of the United States Patent and Trademark Office*